US007505594B2

(12) United States Patent
Mauro

(10) Patent No.: US 7,505,594 B2
(45) Date of Patent: Mar. 17, 2009

(54) DISCONTINUOUS TRANSMISSION (DTX) CONTROLLER SYSTEM AND METHOD

(75) Inventor: Anthony Mauro, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 732 days.

(21) Appl. No.: 09/742,039

(22) Filed: Dec. 19, 2000

(65) Prior Publication Data

US 2002/0172364 A1 Nov. 21, 2002

(51) Int. Cl.

*H04L 9/00* (2006.01)
*H04N 7/167* (2006.01)
*G10L 11/00* (2006.01)
*G10L 11/06* (2006.01)
*H04H 20/71* (2008.01)
*G10L 21/00* (2006.01)

(52) U.S. Cl. ....................... 380/261; 380/201; 713/171; 704/208; 704/270; 370/312

(58) Field of Classification Search ................. 380/201, 380/261; 704/270, 208; 713/171; 370/312
See application file for complete search history.

(56) References Cited

U.S. PATENT DOCUMENTS 4,817,146 A * 3/1989 Szczutkowski et al. ...... 380/261
5,414,796 A 5/1995 Jacobs et al.
5,680,507 A * 10/1997 Chen .......................... 704/223
5,696,873 A * 12/1997 Bartkowiak ................. 704/216
5,911,128 A 6/1999 DeJaco
6,122,384 A 9/2000 Mauro
6,188,981 B1 * 2/2001 Benyassine et al. ......... 704/233
6,222,828 B1 * 4/2001 Ohlson et al. ............... 370/320
6,233,550 B1 * 5/2001 Gersho et al. ............... 704/208
6,269,331 B1 * 7/2001 Alanara et al. .............. 704/205
6,272,633 B1 * 8/2001 Duke et al. ................. 713/171
6,275,794 B1 * 8/2001 Benyassine et al. ......... 704/207
6,298,055 B1 * 10/2001 Wildfeuer ................... 370/352
6,374,211 B2 * 4/2002 Stegmann et al. ........... 704/211
6,477,150 B1 * 11/2002 Maggenti et al. ............ 370/312
6,556,966 B1 * 4/2003 Gao ........................... 704/220
6,571,212 B1 * 5/2003 Dent ....................... 704/270.1
6,606,593 B1 * 8/2003 Jarvinen et al. ............. 704/223
6,691,092 B1 * 2/2004 Udaya Bhaskar et al. ... 704/265
6,904,403 B1 * 6/2005 Muraki et al. ............... 704/212

(Continued)

OTHER PUBLICATIONS

Benyassine, Eyal Shlomot, Su, Huan-Yu, "ITU-T Recommendation G.729 Annex B: A Silence Compression Scheme for Use with G.729 Optimized for V.70 Digital Simultaneous Voice and Data Applications," Sep. 1997, IEEE Communications Magazine, pp. 64-72.*

(Continued)

*Primary Examiner*—Kaveh Abrishamkar
(74) *Attorney, Agent, or Firm*—Abdollah Katbab; Michael J. DeHaemer; Thomas R. Rouse

(57) ABSTRACT

A method and apparatus for controlling a discontinuous transmission process. Audio information is digitized and provided to a vocoder. A voice activity level is determined from the digitized audio signal, and if voice activity is present, active vocoder frames are generated at a predetermined output rate. If voice activity is not detected, inactive vocoder frames are generated. During transitions between periods of speech activity and speech inactivity, transition frames are generated, the transition frames comprising background noise information.

17 Claims, 9 Drawing Sheets

U.S. PATENT DOCUMENTS 7,003,114 B1 * 2/2006 Mauro ........................ 380/261

OTHER PUBLICATIONS

Beritelli, Francesco, Casale, Salvatore, Cavallaro, A Robust Voice Activity Detector for Wireless Communications Using Soft Computing, Dec. 1998, IEEE Journal on Selected Areas in Communications, vol. 16, No. 9, pp. 1818-1829.*

Beritelli, Francesco, "A Modified CS-ACELP Algorithm for Variable-Rate Speech Coding Robust in Noisy Environments," Feb. 1999, IEEE Signal Processing Letters, vol. 6, No. 2, pp. 31-34.*

* cited by examiner

| | | | | | | |
|---|---|---|---|---|---|---|
| VOCODER FRAME | 1 | 2 | 3 | 4 | 5 | 6 |
| STATE VECTOR | 1 | 2 | 3 | 4 | 5 | 6 |

FIG. 8A

| | | | | | | |
|---|---|---|---|---|---|---|
| VOCODER FRAME | 1 | 2 | ~~3~~ | 4 | 5 | 6 |
| STATE VECTOR | 1 | 2 | 3 | 4 | 5 | 6 |

FIG. 8B

| | | | | | | |
|---|---|---|---|---|---|---|
| VOCODER FRAME | 1 | 2 | ~~3~~ | ~~4~~ | ~~5~~ | 6 |
| STATE VECTOR | 1 | 2 | 2 | 2 | 2 | 3 |

FIG. 8C

DISCONTINUOUS TRANSMISSION (DTX) CONTROLLER SYSTEM AND METHOD

BACKGROUND OF THE INVENTION

I. Field

The disclosed embodiments pertain generally to the field of wireless data communications, and more specifically to a method and apparatus for controlling vocoder frame generation in a discontinuous transmission communication system.

II. Background

Wireless communications have become commonplace in much of the world today. In many digital wireless communication systems, audio information, typically voice, is transmitted between wireless communication devices and other end units via infrastructure equipment. Examples of various communication systems include code division multiple access (CDMA) systems, global system for mobile communications (GSM) systems, wideband code division multiple access (WCDMA) systems, as well as others.

In many wireless communication systems, human speech is converted into electronic signals and digitized. The digitized speech is often provided to a vocoder, which is a well known device in the art for compressing the digitized speech signal for efficient wireless transmission. The output of the vocoder comprises vocoder frames, which are discrete "packages" of bits representing the compressed digitized speech. Vocoders may operate using either fixed or variable rate encoding techniques, both of which are well known in the art. In either case, vocoders operate to take advantage of natural pauses, or lapses, inherent in human speech to provide bandwidth compression. In some communication systems using fixed rate vocoders, vocoder frames are not transmitted during periods of speech inactivity, thereby reducing the bandwidth necessary for the communication.

Several problems are inherent in the fixed rate vocoder application. First, the transition from periods of speech activity to periods of speech inactivity may be noticeable to users. Another problem is that the background noise inherent in most telephonic communications is not preserved as the communication transitions from periods of speech activity to periods of speech inactivity. These problems are exacerbated in communication systems employing secure communication techniques, such as public key encryption techniques.

In a fixed rate vocoder application, it would be desirable to preserve the background noise during such transitions so that users do not perceive noticeable sound quality differences.

SUMMARY OF THE INVENTION

The disclosed embodiments are directed to a discontinuous transmission controller method and apparatus. In one embodiment, the disclosed embodiments are directed to an apparatus comprising a vocoder for generating vocoder frames from said digitized audio signal at a predetermined output rate if speech is present, for generating no vocoder frames during periods of speech inactivity, and for generating transition frames during transitions from speech activity to speech inactivity, the transition frames comprising background noise information.

In another embodiment, the method comprises determining a voice activity level in a digitized audio signal, and generating vocoder frames at a predetermined rate in a transmitter if speech activity is present. In no speech activity is detected, no vocoder frames are generated. During a transition period between speech activity and speech inactivity, transition frames are generated, the transition frames comprising background noise information.

BRIEF DESCRIPTION OF THE DRAWINGS

FIGS. 8A, 8B, and 8C illustrate the relationship between vocoder frames and a state vector as used in the transmitter of FIG. 7;

FIG. 8A illustrates a sequential series of vocoder frames and a value of a state vector generated;

DETAILED DESCRIPTION

The embodiments described herein are described with respect to a terrestrial wireless communication system. However, it should be understood that the present invention may be used in any communication system which uses vocoders to reduce the transmission bandwidth of information. Such communication systems comprise the many variations of digital communication systems found today, including code division multiple access (CDMA) systems, global system for mobile communications (GSM) systems, wideband code division multiple access (WCDMA) systems, and others.

Figure 1:
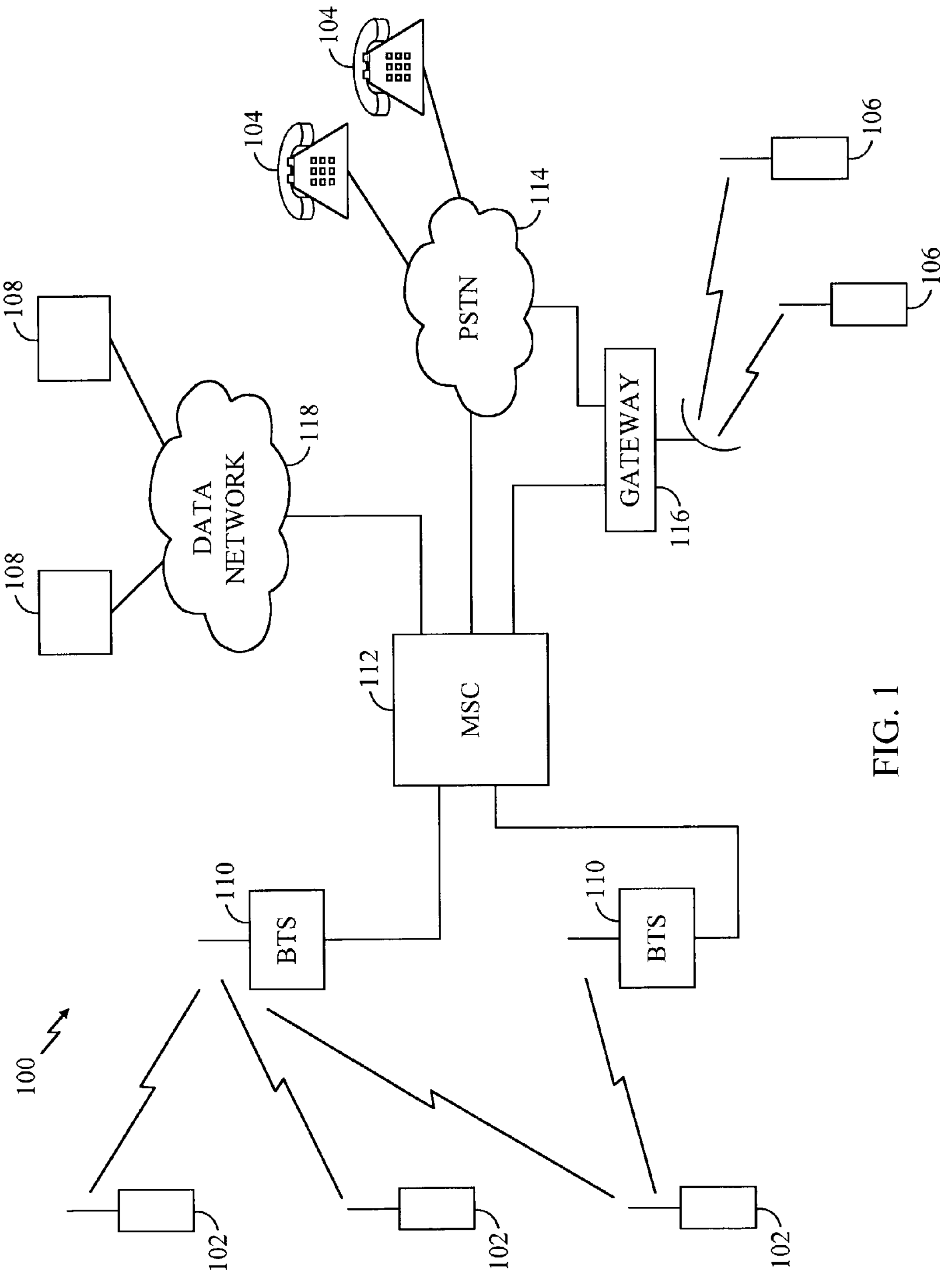
FIG. 1 illustrates a functional block diagram of a typical terrestrial wireless communication system employing the disclosed embodiments.

A functional block diagram of a typical terrestrial wireless communication system 100 employing the embodiments of the present invention is shown in FIG. 1. Wireless communication devices (WCDs) 102 send and receive wireless transmissions to other wireless communication devices 102 through base station transceiver(s) 110 and base station controller 112, to landline communication devices 104 using public switched telephone network (PSTN) 114, to satellite communication devices 106 using gateway 116, or to data communication devices 108 over data network 118. In one embodiment, WCDs 102 and satellite communication devices 106 comprise wireless telephones, while landline communication devices 104 comprise landline telephones and data communication devices 108 comprise digital modems in conjunction with an analog telephone.

Figure 2:
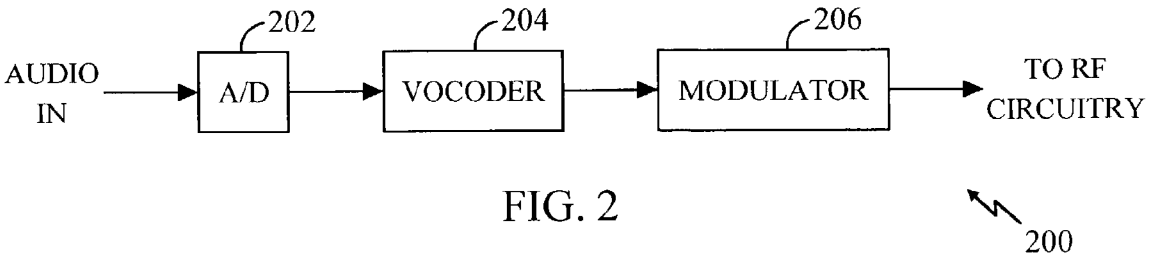
FIG. 2 illustrates a functional block diagram of a portion of a transmitter used in an exemplary wireless communication device (WCD) of the communication system in FIG. 1.

FIG. 2 illustrates a functional block diagram of a portion of transmitter 200 used in an exemplary WCD 102. Audio information, such as human speech, is received by analog-to-digital (A/D) converter 202. Typically, the audio information additionally comprises background noise. The audio information is converted into a digitized electronic signal by A/D 202. The process of such a conversion is well known in the art. The digitized audio information is then provided to vocoder 204.

Vocoder 204 is responsible for compressing the digitized audio information to minimize the bandwidth necessary for transmission. The output of vocoder 204 comprises vocoder frames, which are discrete packages of information representing the compressed digitized speech. Vocoders may operate using either fixed or variable rate encoding techniques, both of which are well known in the art. In systems using variable-rate vocoders, bandwidth efficiency is achieved by encoding the digitized audio information in one of a number of different encoding rates, each encoding rate representative of the level of speech activity present in the audio information.

An example of a variable-rate vocoder is found in U.S. Pat. No. 5,414,796(the '796patent) entitled "VARIABLE RATE VOCODER", assigned to the assignee of the present invention and incorporated by reference herein. The '796 patent describes a variable-rate vocoder having four encoding rates: a first encoding rate for encoding audio information during periods of active speech, a second and third encoding rates each successively less than the previous encoding rates for encoding the audio information during transitions between active speech and inactive speech, and a fourth encoding rate for encoding the audio information at a rate lower than the other three rates for encoding audio information during periods of no or low speech activity.

The statistical characteristics of a speech signal can be demonstrated by what is generally known as a source-filter model. Speech data can be significantly compressed with this type of modeling. Thus, a communication channel can be efficiently used for more transmission. The source-filter model assumes that speech is the result of exciting linear time-varying filters with a source signal. The excitation source signal is modeled as either a periodic impulse train for voiced speech like vowel sounds, or a random noise for unvoiced speech like consonants. The linear time-varying filters usually include a formant synthesis filter, or a linear predictive coding (LPC) synthesis filter, and a pitch synthesis filter.

In systems using fixed-rate vocoders, vocoder frames are not generated during periods of speech inactivity, thereby reducing the bandwidth necessary for the communication. Fixed-rate vocoders are well known in the art.

In one embodiment of the present invention, vocoder 204 comprises a fixed-rate vocoder which performs an analysis of the input audio information to determine a level of voice activity. A control signal is generated in response to the voice activity determination, which is used internally by vocoder 204 and is also provided to other functional blocks, such as a transmitter (not shown) and/or a processor (also not shown), to control a discontinuous transmission process. The discontinuous transmission process refers to a process of disabling the transmission of vocoder frames during periods of no or low voice activity. When a low/no level of speech activity is detected by vocoder 204, a control signal is used internally to vocoder 204, as will be explained below. It is also used to signal other elements when to discontinue transmission.

Generally, vocoder frames are generated at a predetermined, fixed output rate in either the fixed-rate case or the variable-rate case. In one embodiment, vocoder frames are generated at an output rate of one frame every 20 milliseconds. The vocoder frames are next provided to modulator 206. Modulator 206 modulates the vocoder frames using the predetermined modulation technique of the wireless communication system. Examples of different modulation techniques include Time Division Multiple Access (TDMA), Code Division Multiple Access (CDMA), and Frequency Division Multiple Access (FDMA). Once the vocoder frames have been modulated, they are provided to RF circuitry for upconvertion and transmission.

Figure 3:
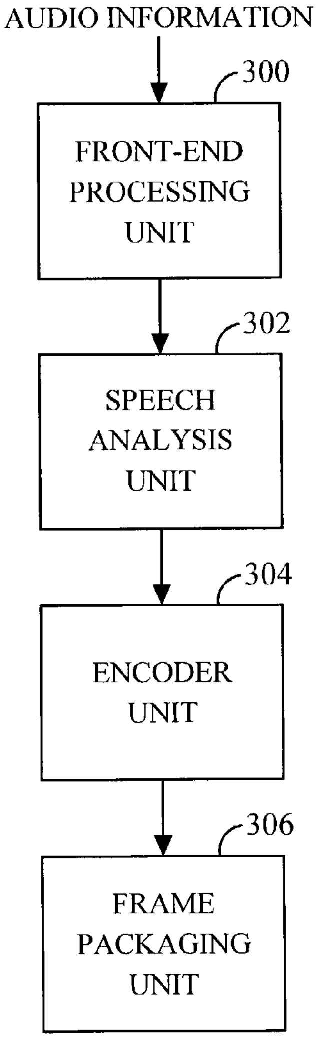
PRIOR ART FIG. 3
FIG. 3 is a functional block diagram of a prior art fixed-rate vocoder.

FIG. 3 is a functional block diagram of a prior art fixed-rate vocoder 204. Audio information is provided to the front-end processing unit 300 comprising audio front-end functions such as D.C. removal and echo cancellation. The preprocessed audio information is then provided to SPEECH analysis unit 302, where standard linear prediction analysis is performed for model parameter estimation, ultimately to determine the poles in a speech synthesis filter. The preprocessed audio information is then provided to an encoder unit 304 to determine the excitation to the synthesis filter as well as to quantize parameters used to represent the audio information. Generally, each type of vocoder uses a different set of parameters to represent audio information. Table 1 shows the parameters used in a traditional Mixed Excitation Linear Prediction (MELP) vocoder model.

TABLE 1

| MELP Parameter | |
|---|---|
| msvq[0] | (line spectral frequencies) |
| msvq[1] | (line spectral frequencies) |
| msvq[2] | (line spectral frequencies) |
| msvq[3] | (line spectral frequencies) |
| fsvq | (Fourier magnitudes) |
| gain[0] | (gain) |
| gain[1] | (gain) |
| pitch | (pitch - overall voicing) |
| bp | (bandpass voicing) |
| af | (aperiodic flag/jitter index) |
| sync | (sync bit) |

Finally, the parameters are assembled in a vocoder frame using frame packaging unit 306. Note that in this example the vocoder encodes data at a fixed encoding rate. Therefore, the vocoder frame size (i.e., number of bits) is fixed over all speech conditions.

Figure 4:
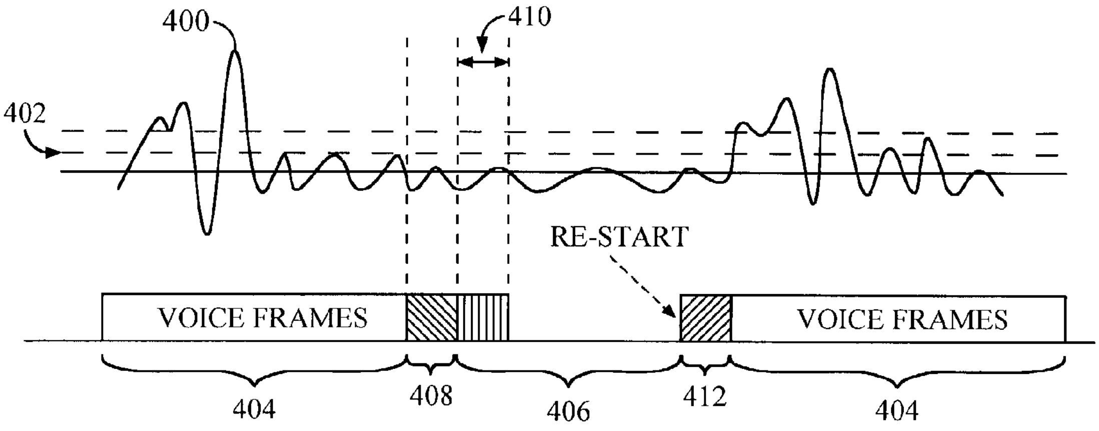
FIG. 4 illustrates one embodiment of the basic concept of the method and apparatus for controlling a discontinuous transmission process.

FIG. 4 illustrates one embodiment of the basic concept of the method and apparatus for controlling a discontinuous transmission process. In this embodiment, digitized audio information is provided to a fixed-rate vocoder. In another embodiment, a variable-rate vocoder is used. Digitized audio information 400 is shown varying with respect to time. A voice activity detector is used to determine the level of speech activity in the digitized audio information using one or more voice activity detector (VAD) thresholds 402. During periods of high voice activity above a first threshold, "active" vocoder frames are generated at a fixed encoding rate in the fixed-rate vocoder application and at a full rate in the variable-rate vocoder application. This period of shown in FIG. 4 as active periods 404.

When the voice activity level falls below a second threshold representing a low level of speech activity, or no speech activity, an "inactive" frame is generated. This period is shown in FIG. 4 as inactive period 406. In the fixed-rate vocoder application, the inactive frame is a representation of background noise encoded at the fixed encoding rate. In the variable-rate vocoder application, the inactive frame is again a representation of the background noise encoded at a minimal encoding rate. In either case, in the discontinuous communication system, inactive frames are not transmitted.

The transition period between periods of high voice activity to no/low voice activity is known as a "transition" period, or a "grace" period, shown as transition period 408. During this period of time, "transition" vocoder frames are generated. The transition frames contain information relating to background noise, otherwise known as "comfort noise" for reproduction at a receiver. Comfort noise is generated so that a user is not annoyed by the disappearance of background noise during periods of silence. The transition frames provide information to the receiver in order to maintain the background noise generated at transmitter 200. An optional "blank" period 410 provides for a minimum period of time that the vocoder is in the inactive period 406. When voice activity again exceeds the first threshold, active vocoder frames are generated once again. In one embodiment, no transition frames are generated from transitions between inactive period 406 and active period 404. In another embodiment, a "restart" period 412 is defined in which transition frames are generated in much the same way as transitions from active period 404 to inactive period 406, as explained below.

Figure 5:
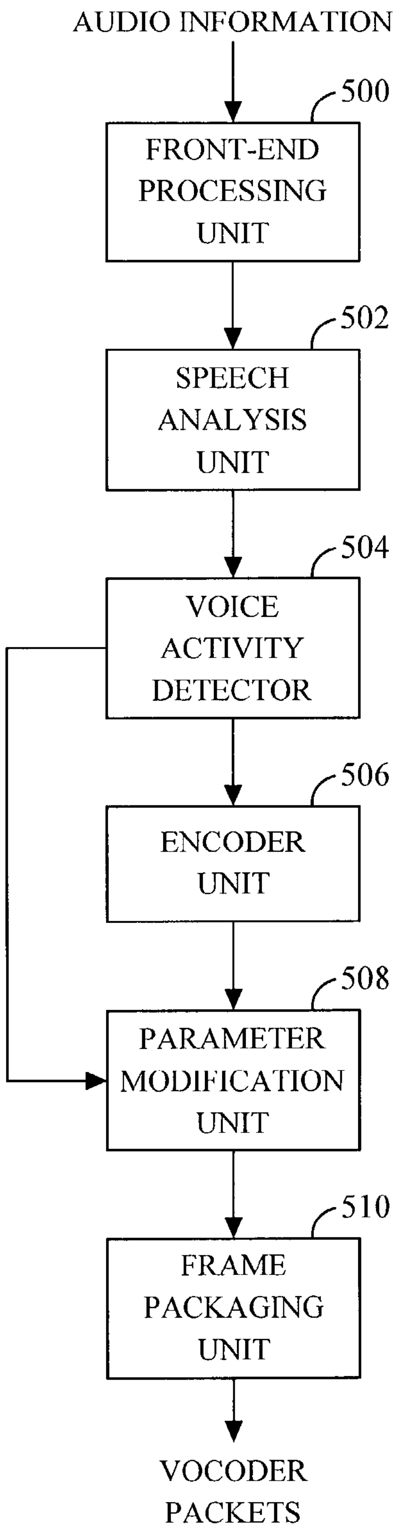
FIG. 5 illustrates a fixed-rate vocoder using a rate detector to determine voice activity.

FIG. 5 illustrates a fixed-rate vocoder 204 using a rate detector to determine voice activity which, in turn, controls the discontinuous transmission process. Front-end processing unit 500 and SPEECH analysis unit 502 operate in the same manner as the corresponding elements in FIG. 3. The preprocessed audio information is then provided to voice activity detector 504. Voice activity detector 504 uses one of several well-known techniques to determine a voice activity level of the preprocessed audio information. Once the voice activity level is detected, voice detector 504 generates a control signal which is normally used in a variable-rate vocoder to control the encoding rate of vocoder 204. In the present case, the control signal does not alter the encoding rate of the fixed-rate vocoder. Rather, it is used to signal other elements of vocoder 204 when to generate active frames, inactive frames, and transition frames. The control signal is also used by other elements external to vocoder 204, generally for the purpose of enabling and disabling the transmission of vocoder frames.

In one embodiment, voice activity detector 504 determines the level of voice activity by relying on a rate decision algorithm, many of which are well known in the art. The rate decision algorithm is typically used in variable-rate vocoder applications to determine the various encoding rates to apply to audio information.

One such rate decision algorithm is disclosed in U.S. Pat. No. 5,911,128, entitled "METHOD AND APPARATUS FOR PERFORMING REDUCED RATE VARIABLE RATE VOCODING,"issued Jun. 8, 1999, assigned to the same assignee and incorporated by reference herein. This technique provides a set of rate decision criteria referred to as mode measures. A first mode measure is the target matching signal to noise ratio (TMSNR) from the previous encoding frame, which provides information on how well the encoding model is performing by comparing a synthesized speech signal with the input speech signal. A second mode measure is the normalized autocorrelation function (NACF), which measures periodicity in the speech frame. A third mode measure is the zero crossings (ZC) parameter, which measures high frequency content in an input speech frame. A fourth measure, the prediction gain differential (PGD), determines if the encoder is maintaining its prediction efficiency. A fifth measure is the energy differential (ED), which compares the energy in the current frame to an average frame energy. Using these mode measures, a raw determination logic selects an encoding rate for a current vocoder frame. Voice activity detector 406 determines the level of voice activity from the rate determination. For example, voice activity detector 406 generates a control signal indicative of high voice activity if the rate determination algorithm selects full rate encoding.

In any case, voice activity detector 504 generates a control signal based on the level of speech activity detected. In one embodiment, the control signal indicates active state when a high level of voice activity is detected, an inactive state when a low level of voice activity (or none) is detected, and indicates a transition state when the voice activity transitions from a high level to a low level (or none). In anther embodiment, transition frames are also generated during transitions from the inactive state to the active state. For example, in the four-encoding-rate example provided in the '796 patent, a full encoding rate corresponds to a high level of voice activity while the eighth encoding rate corresponds to a low/no level of voice activity. The half and fourth encoding rates are used as flags to help smooth the transition from active speech to no/low speech. The control signal is provided to a parameter modification unit 508 within vocoder 204.

Encoder unit 506 receives the preprocessed audio information from voice activity detector 504 and performs an analysis of the audio information as explained above with respect to encoder unit 304 to determine the excitation to the synthesis filter as well as to quantize parameters used to represent the audio information. The parameters are then provided to parameter modification unit 508. Parameter modification unit 508 receives the parameters from encoder unit 506 and the control signal from voice activity detector 504. If the control signal indicates a transition from high to no/low levels of voice activity, steps are taken so that parameter smoothing can take place. For example, the lap and gain parameters are modified to include a background noise estimate. This is used at the decoder to generate the comfort noise which is equivalent to the ambient noise at the encoder.

Finally, the parameters are assembled in a vocoder frame using frame packaging unit 510. In a variable-rate vocoder application, the control signal from voice activity detector is also provided to packaging unit 510 to determine the number of bits to include in each vocoder frame.

Figure 6:
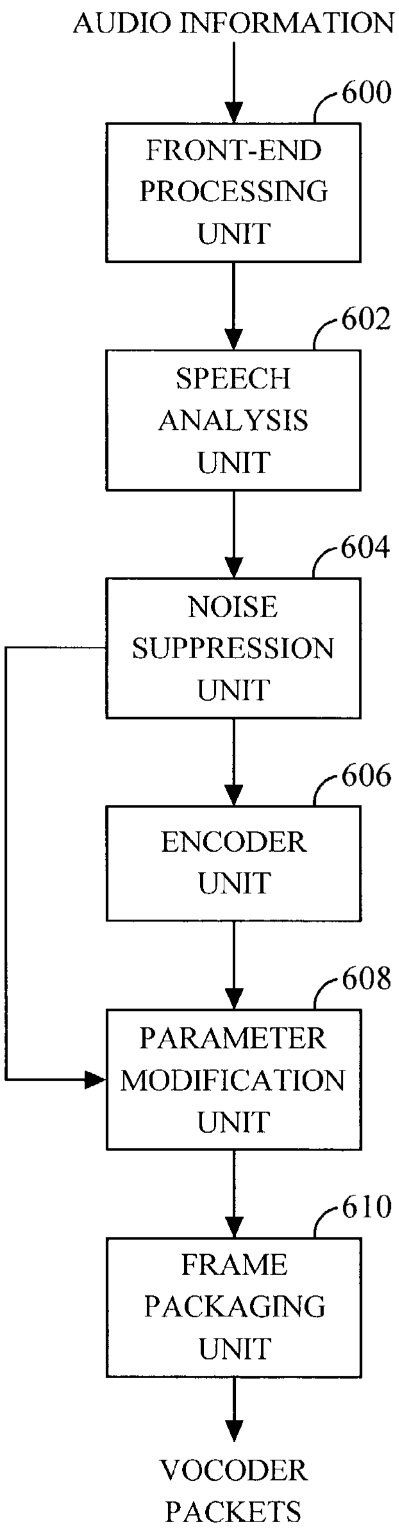
FIG. 6 illustrates a second embodiment of controlling the discontinuous transmission process.

FIG. 6 illustrates a second embodiment of controlling the discontinuous transmission process. In this embodiment, the voice activity detector 504 of FIG.5 is replaced by a background noise suppression element 604 to determine voice activity instead of voice activity detector 504 All other functional blocks shown in FIG. 6 operate in a similar way to the functional blocks of FIG. 5

Background noise suppression element 606 provides a control signal based upon detection and suppression of background noise, such as undesired noise from automobile traffic, wind, crowds, and so on. One example of such a noise suppressor is found in U.S. Pat. No. 6,122,384(the '384patent) entitled "NOISE SUPPRESSION SYSTEM AND METHOD", assigned to the same assignee and incorporated by reference herein.

Typically, noise suppression element 604 generates a control signal having two states: an encode state and a disable state. The control signal is provided to parameter modification unit 608 so that parameter modification during transition periods can take place. The noise suppression element described by the '384 patent comprises a rate decision element used to determine the level of voice activity. The rate decision element may be used by noise suppression element 606 to determine when to transition between states. In another embodiment, the rate decision element provides a control signal directly to parameter modification unit 608.

Figure 7:
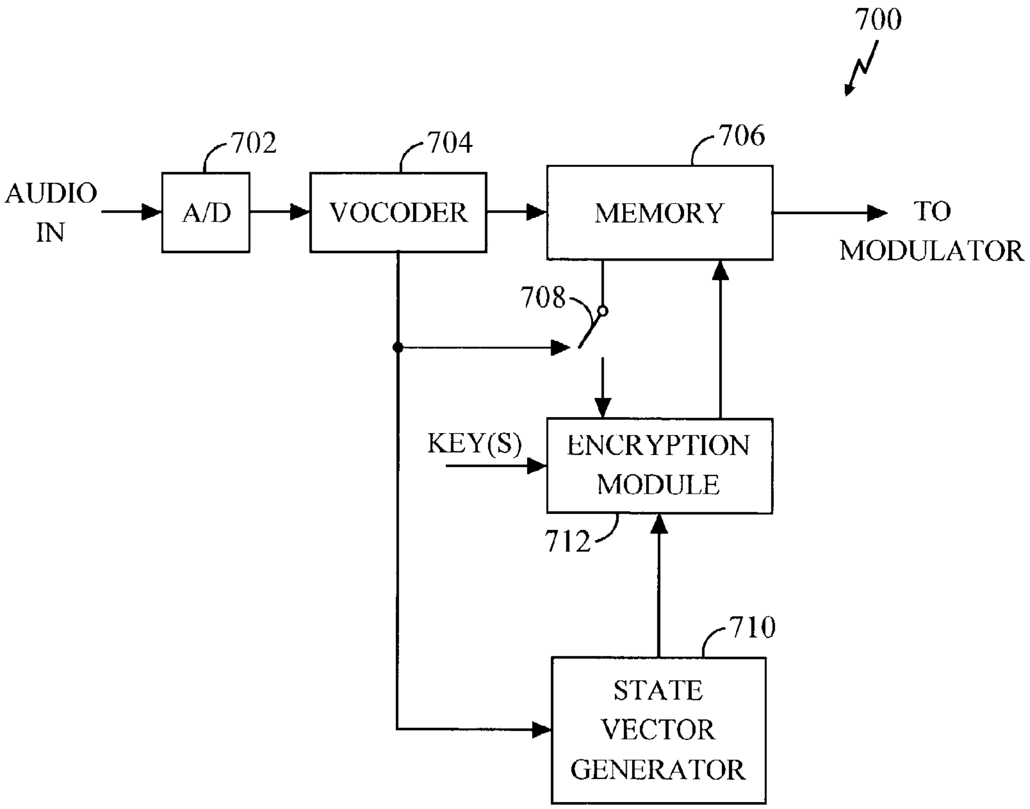
FIG. 7 illustrates a transmitter comprising an encryption module for transmitting secure communications.

The control signal from voice activity detector 504 or noise suppression unit 604 can be used in elements other than vocoder 204 to further control the discontinuous transmission process. For example, FIG. 7 illustrates a transmitter 700 comprising encryption module 712 Such a transmitter is used to safeguard voice or data communications from unauthorized third parties using techniques such as public key encryption.

As before, audio information is received by A/D 702 and converted into a digitized signal. The digitized signal is provided to vocoder 704, where vocoder frames are generated from the digitized signal. Vocoder 704 generates vocoder frames for each of the three defined voice activity states: active, inactive, or transition, and provides them to an optional memory 706. Memory 706 typically comprises one or more random access memories (RAM). Memory 706 may also be segregated into a "clear" portion and an encrypted portion. The clear portion is used to store vocoder frames prior to encryption. After vocoder frames are encrypted, they may be stored in memory 706, however, special security measures ensure that no encrypted vocoder frames are allowed to be co-mingled with clear vocoder frames. Vocoder 704 also provides a control signal to switch 708 and to state vector generator 710 to achieve discontinuous transmission.

Encryption module 712 is responsible for encrypting each vocoder frame with a unique code, or codebook. Generally, one codebook is generated for each data frame to be encrypted, generally at the same rate that frames are generated by vocoder 704. Therefore, one codebook is generally available for each data frame to be encrypted. Other techniques allow two vocoder frames to encrypted with one codebook, the codebook having twice as many bits as one vocoder frame.

The codebook is created using one of several well-known techniques. Among them are the Data Encryption Standard (DES), FEAL, and the International Data Encryption Algorithm (IDEA). In one embodiment of the present invention, DES is used to create codebooks, using a state vector along with one or more encryption keys, as shown in FIG. 7. The state vector is, in its simplest form, a counting sequence, incrementing at a predetermined rate, generally equal to a multiple of the rate at which vocoder frames are generated by vocoder 704. The state vector is generated by state vector generator 710, using well known techniques, such as discrete electronic components, or a digital microprocessor in combination with a set of software instructions. Other techniques well known in the art are also contemplated.

Encryption module 712 produces one codebook every time state vector generator 710 is incremented. Each codebook produced is digitally combined with one vocoder frame stored in memory 706, generally in the order that the vocoder frames were stored in memory 706, to produce one encrypted data frame for every vocoder frame provided to encryption module 712. Codebooks are combined with vocoder frames using well-known techniques, such as adding one vocoder frame to one codebook using modulo-2 arithmetic. In another embodiment, 2 vocoder frames are added to a single codebook, the codebook in this embodiment having twice the number of bits as a single vocoder frame.

One problem using the encryption method in conjunction with the discontinuous transmission process as described above is that the discontinuous transmission process causes discontinuities in the encrypted frames generated by encryption module 712. Discontinuities result from the state vector generated by state vector generator 710 incrementing at a time at which inactive frames are generated during periods of no/low voice activity. During this time, the control signal from vocoder 704 opens switch 708 to prevent inactive frames from being encrypted. This problem is best illustrated in FIGS. 8*a*, 8*b*, and 8*c*.

FIG. 8A illustrates a sequential series of vocoder frames numbered one through six and the value of the state vector generated by state vector generator 710 corresponding to each vocoder frame. In one embodiment 2 vocoder frames are generated at a constant output rate of one frame every 20 milliseconds by vocoder 704. Each vocoder frame may be stored briefly in memory 706 prior to use by encryption module 712 In an alternative embodiment, vocoder frames are provided directly to encryption module 712 In either case, vocoder frames are provided to encryption module 712 via switch 708 at the same rate tat vocoder 704 produces vocoder frames. State vector generator 710 is incremented at the predetermined rate, generally a multiple of the rate at which vocoder frames are generated by vocoder 704.

In FIG. 8A vocoder frame 1 is encoded by encryption module 712, using a codebook derived from state vector 1. Frame 2 is next encoded, using a codebook derived from state vector 2. Frame 3 is next encoded, using a codebook derived from state vector 3, and so on. In a receiver, the encrypted vocoder frames are decrypted using a state vector which is synchronized to frames being encrypted at transmitter 700. In other words, vocoder frame 1, which was encrypted using a codebook derived from state vector 1. is decrypted using a codebook derived from a state vector equal to 1. Vocoder frame 2 is decrypted using a codebook derived from a state vector equal to 2, and so on.

FIG. 8B illustrates a problem of the encryption process of FIG. 7*a* when an inactive vocoder frame is generated by vocoder 704. As before, vocoder frames 1 through 6 are shown in sequence as generated by vocoder 704. First, an active vocoder frame 1 is generated and encoded by encryption module 712 (with or without the use of memory 706) using a codebook derived from state vector 1. Next, an active vocoder frame 2 is generated by vocoder 204 and then encrypted using a codebook derived from state vector 2. Next, frame 3 is generated by vocoder 704, however, in ibis example, frame 3 is an inactive vocoder frame. The control signal from vocoder 704 opens switch 708 so that the inactive vocoder frame is not encrypted by encryption module 712. The inactive frame is generally over-written in memory 706 with frame 4 in the following 20. millisecond time interval. If state vector generator 710 is allowed to continue to increment, a codebook resulting from state vector 3 is generated, but because a vocoder frame has not been provided to encryption module 712, an encrypted frame is not generated. Next, vocoder frame 4 is generated and encrypted using a codeboolc derived from state vector 4.

At a receiver, vocoder frame 1 is received and decrypted using a codebook derived from state vector 1. Vocoder frame 2 is then decrypted using a codebook derived from state vector 2. The next frame received is vocoder frame 4, because vocoder frame 3 was not encrypted or transmitted. When vocoder frame 4 is decrypted using a codebook derived from state vector 3, unintelligible data results, because vocoder frame 4 was encrypted using a codebook derived from a state vector equal to 3.

In this embodiment, when an inactive vocoder frame is generated by vocoder 704, state vector generator 710 is disabled by the control signal from vocoder 704 that a state vector is not incremented during times when inactive frames are generated. This is illustrated in FIG. 8C.

As shown in FIG. 8C, vocoder frames 1 through 6 are generated by vocoder 704. However, in this example, vocoder frames 3, 4, and 5 comprise inactive frames. Vocoder frame 1 is encoded using a codebook derived from state vector 1. Vocoder frame 2 is encoded using a codebook derived from state vector 2. When voice activity drops to a low threshold, inactive vocoder frames 3, 4, and 5 are generated by vocoder 704. Vocoder 704 sends a control signal to state vector generator 710, disabling the state vector generator from incrementing for the duration of frames 3, 4, and 5. Switch 708 is also opened to prevent the inactive frames from being encrypted. When voice activity is detected once again, the control signal from vocoder 704 enables state vector generator to resume its count, in this example, to a value of 3. Therefore, vocoder frame 6 is encrypted using a codebook derived from state vector 3.

At the receiver, vocoder frame 1 is received and decrypted using a codebook derived from a state vector equal to 1. Vocoder frame 2 is decrypted using a codebook derived from a state vector equal to 2. The next frame to be received is vocoder frame 6, since vocoder frames 3, 4, and 5 were not transmitted. Vocoder frame 6 is decrypted using a codebook derived from a state vector equal to 3, which is the state vector used to encode this frame at transmitter 700. As one can see, this method preserves the crypto-synchronization between transmitter 700 and a receiver.

Figure 9:
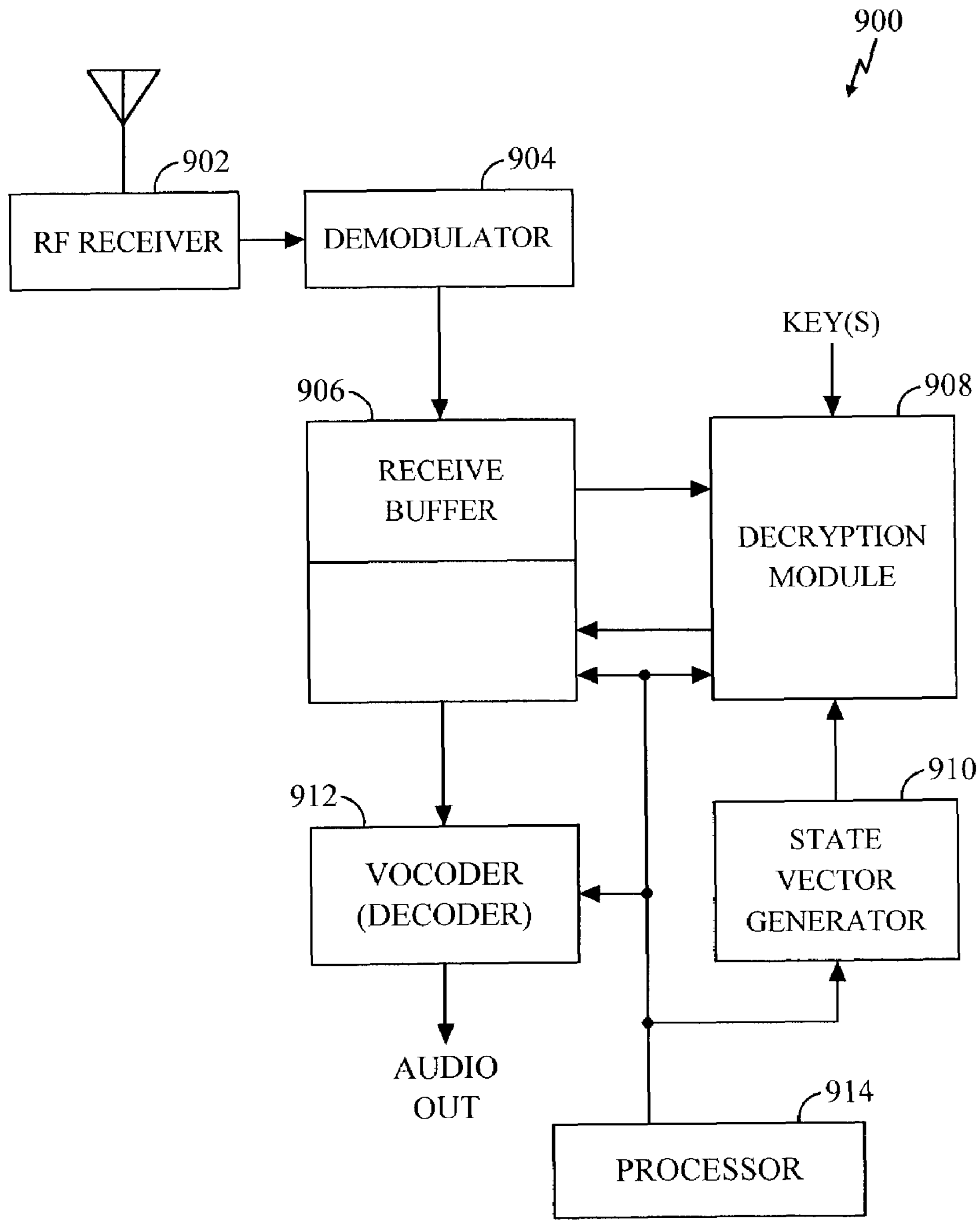
FIG. 9 is a functional block diagram of a receiver used to decode vocoder frames from a transmitter using the discontinuous transmission method and apparatus using cryptographic techniques.

FIG. 9 is a functional block diagram of a receiver 900 used to decode vocoder frames from a transmitter using the discontinuous transmission method and apparatus as described above using cryptographic techniques. Note that not all functional blocks comprising receiver 900 are shown in FIG. 9 for purposes of clarity. In FIG. 9, the upconverted signal is received by RF receiver 902 using techniques well known in the art. The upconverted signal is downconverted then provided to demodulator 904, where the downconverted signal is converted into vocoder frames. The generation of vocoder frames may involve other processing apparatus and steps which are not shown in FIG. 9.

The vocoder frames are then stored in receive buffer 906 for use by decryption module 908. Receive buffer 906 is shown being partitioned into a clear portion and a secure portion. Vocoder frames arriving from demodulator 904 and prior to decryption are secure and stored in the secure portion of receive buffer 906. After vocoder frames have been decrypted by decryption module 908, they are stored in the clear section of receive buffer 906. Of course, two or more independent buffers could be used in the alternative.

Decryption module 908 is responsible for decrypting each vocoder frame stored in receive buffer 906 with a unique codebook, similar to the technique used to encrypt data frames as discussed above. Generally, one codebook is generated for each vocoder frame to be generally at the same rare that frames are generated by vocoder 704 at transmitter 700. Therefore, one codebook is generally available for each vocoder frame to be decrypted. Other techniques allow two vocoder frames to be decrypted with one codebook, the codebook having twice as many bits as one vocoder frame.

In one embodiment, a state vector is used to generate the codebook, along with one or more decryption keys. The state vector in FIG. 9, like the state vector in transmitter 700, is a counting sequence, incrementing at the same predetermined rate as the state vector at transmitter 700. The state vector is generated by state vector generator 910, using well known techniques, such as discrete electronic components, or a digital microprocessor in combination with a set of software instructions. Other techniques well known in the art are also contemplated.

Decryption module 908 produces one codebook for every state vector that is provided to it from state vector generator 910. Vocoder frames stored in receive buffer 906 are provided to decryption module 908 in sequence, where a unique codebook derived from the current state vector is digitally combined with each vocoder frame to produce decrypted vocoder frames. Codebooks are combined with data frames using well-known techniques, such as adding one data frame to one codebook, using modulo-2 arithmetic. In another embodiment, 2 data frames are combined with a single codebook, the codebook in this embodiment having twice the number of data bits as a single vocoder frame.

After the decrypted vocoder frames are generated by decryption module 908, they are stored in receive buffer 906 until needed by vocoder 912. Vocoder 912 requires a constant stream of vocoder frames in order to accurately reproduce the original data transmitted by transmitter 700.

The coordination of the above processes is generally handled by processor 914. Processor 914 can be implemented in one of many ways which are well known in the art, including a discrete processor or a processor integrated into a custom ASIC. Alternatively, each of the above block elements could have an individual processor to achieve the particular functions of each block, wherein processor 914 would be generally used to coordinate the activities between the blocks.

Vocoder frames are not received by receiver 900 on a regular basis, due to the discontinuous nature of the transmitter during periods of inactive voice activity. When transmissions have been discontinued for a relatively long amount of time, the number of encrypted vocoder frames available for decryption is depleted from receiver buffer 906. When receiver buffer 906 is depleted, processor 914 instructs vocoder 912 to generate comfort noise as specified by the last few vocoder frames successfully processed. Remember, a transmission discontinuity is preceded by several transition vocoder frames. The last few frames to be processed prior to a transmission discontinuation at transmitter 700 comprise these transition frames. The transition frames, as explained above, contain information pertaining to the background noise estimation occurring at transmitter 700 just prior to a transmission discontinuation. Vocoder 912 uses the information contained in the transition frames to generate a continuous series of vocoder frames similar to the transition frames so that the output of vocoder 912 is not interrupted.

Immediately after receive buffer 906 is depleted of encrypted vocoder frames, processor 914 sends a signal to state vector generator to disable further incrementation of the state vector. When vocoder frames once again become available for decryption in receiver buffer 906, processor 914 re-enables state vector generator so that the state vector can increment in synchronization with the newly received vocoder frames provided to decryption module 908.

Figure 10:
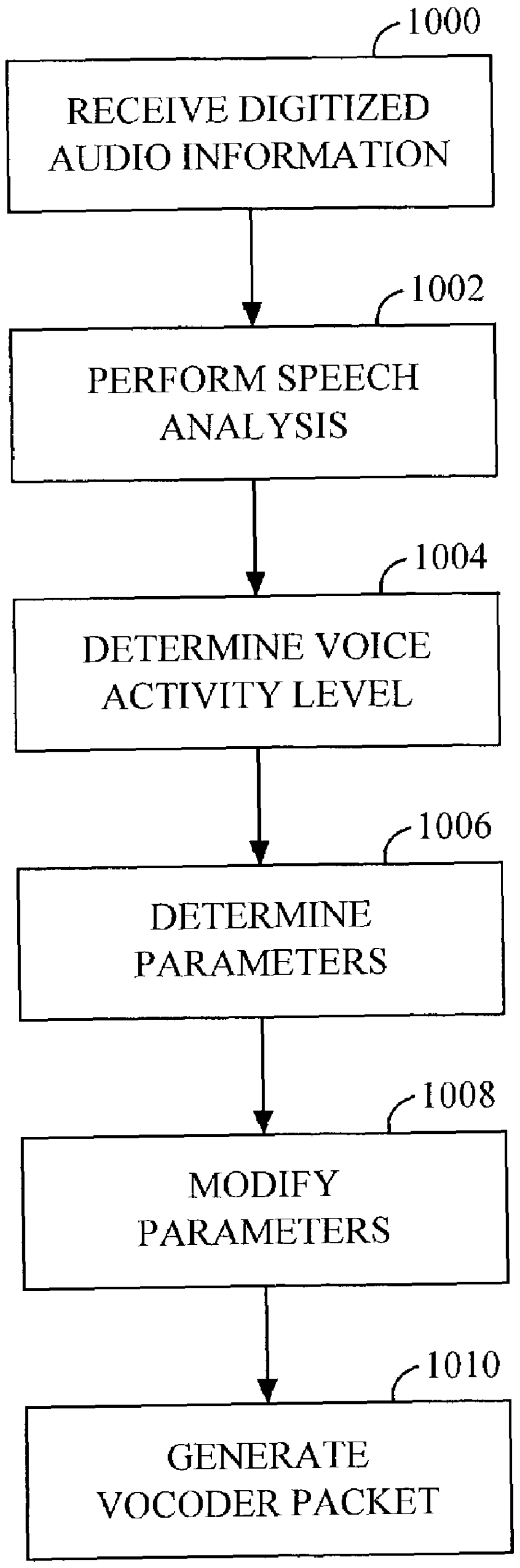
FIG. 10 is a flow diagram illustrating a method of controlling a discontinuous transmission process as used in a transmitter, referencing the vocoder of FIG. 5.

FIG. 10 is a flow diagram illustrating a method of controlling a discontinuous transmission process as used in a transmitter, referencing the vocoder of FIG. 5. In step 1000, digitized audio information is received by front-end processing unit 500 comprising audio front-end functions such as D.C. removal and echo cancellation. The preprocessed audio information is then provided to speech analysis unit 502 in step 1002, where, in one embodiment, standard linear prediction analysis is performed for model parameter estimation, ultimately to determine the poles in a speech synthesis filter. In other encoding schemes, other kinds of analysis is performed to determine the pertinent information needed to perform speech modeling.

In step 1004, the preprocessed audio information is received by voice activity detector 504. Voice activity detector 504 uses one of several well-known techniques to determine a voice activity level of the preprocessed audio information. Once the voice activity level is detected, voice detector 504 generates a control signal which is used to signal other elements of vocoder 204 when to generate active frames, inactive frames, and transition frames.

The control signal is based on the level of speech activity detected. In one embodiment, the control signal indicates an active state when a high level of voice activity is detected, an inactive state when a low level of voice activity (or none) is detected, and indicates a transition state when the voice activity transitions from a high level to a low level (or none). The transition state is used to help smooth the transition from active speech to no/low speech. The control signal is provided to a parameter modification unit 508.

In step 1006, encoder unit 506 receives the preprocessed audio information from voice activity detector 504 and performs an analysis of the audio information to determine the excitation to the synthesis filter as well as to quantize parameters used to represent the audio information.

The parameters are then provided to parameter modification unit 508 in step 1008. Parameter modification unit 508 receives the parameters from encoder unit 506 and the control signal from voice activity detector 504. If the control signal indicates a transition from high to no/low levels of voice activity, steps are taken so that parameter smoothing can take place. For example, the lap and gain parameters are modified to include a background noise estimate. This is used at the decoder to generate the comfort noise which is equivalent to the ambient noise at the encoder. In one embodiment, no modifications to the parameters are necessary if the control signal indicates active speech or inactive speech.

Finally, in step 1010, the parameters are assembled in a vocoder frame using frame packaging unit 510. In a variable-rate vocoder application, the control signal from voice activity detector is also provided to packaging unit 510 to determine the number of bits to include in each vocoder frame.

Figure 11:
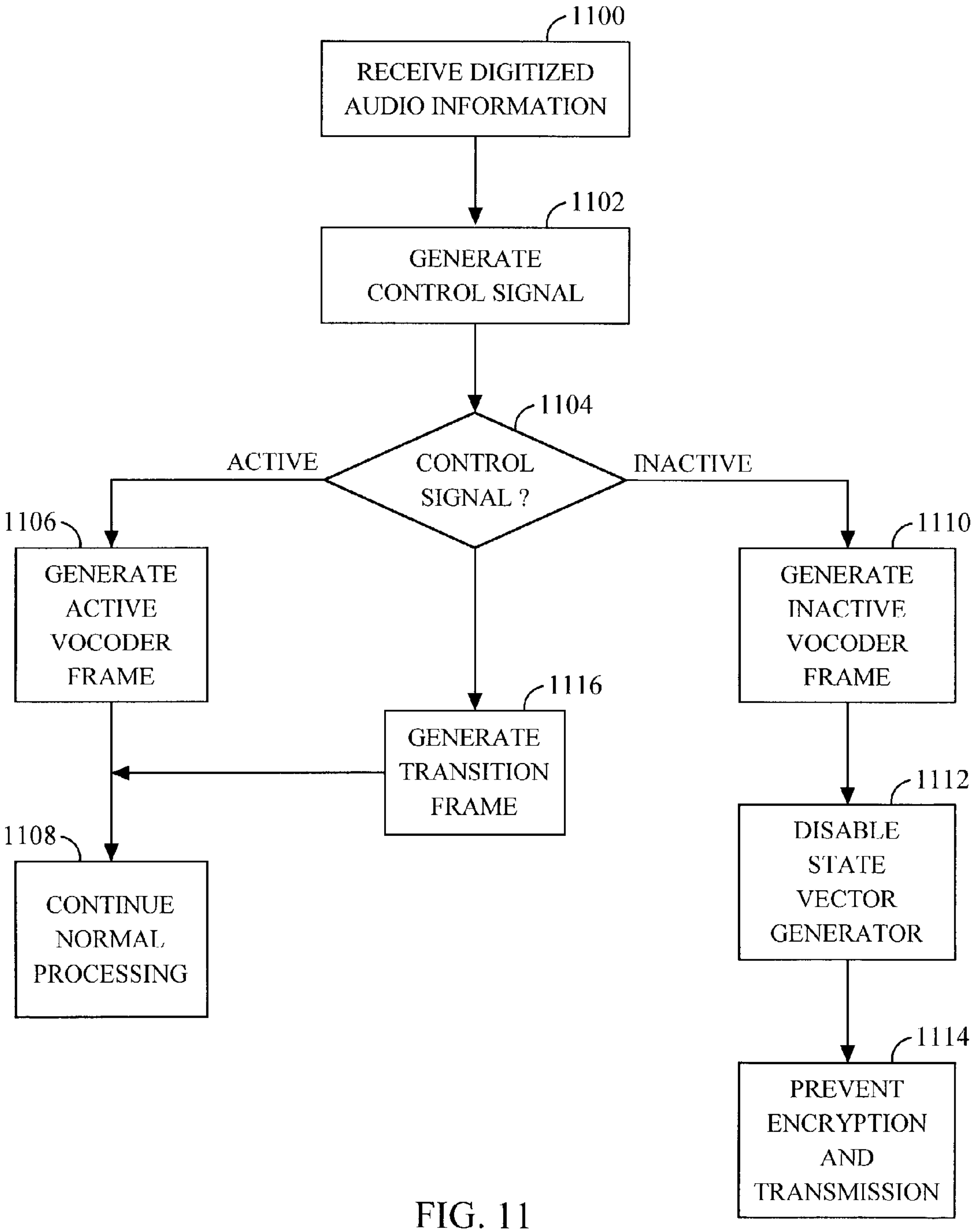
FIG. 11 is a flow diagram illustrating a method of controlling a discontinuous transmission process as used in the transmitter of FIG. 7.

FIG. 11 is a flow diagram illustrating a method of controlling a discontinuous transmission process as used in transmitter 700 employing secure communications. In step 1100, digitized audio information is received by vocoder 704. In step 1102, a control signal representative of at least three speech states is generated. The three states comprise an active state, an inactive state, and a transition state.

Processing continues in one of three ways, as shown in step 1104. If the control signal indicates an active state, processing continues to step 1106, where an active vocoder frame is generated. Next, in step 1108, the active vocoder frame is processed in a normal manner. In this embodiment, the active frame is provided to encryption module 712, state vector generator 710 is incremented, and the active vocoder frame is encrypted and stored in memory 706.

If the control signal in step 1104 indicates an inactive state, processing continues to step 1110, where an inactive vocoder frame is generated. Next, in step 1112, state vector generator 710 is disabled and in step 1114, the encryption and transmission process is prevented. In one embodiment, switch 708 is opened by the control signal thus preventing the inactive frame from being encrypted by encryption module 712. In another embodiment, the control signal instructs a processor to disable an RF transmitter.

If the control signal in step 1104 indicates a transition from the active state to the inactive state, processing continues to step 1116, where a transition frame is generated. The transition frame is then processed like an active frame, as shown in step 1108, being encrypted by encryption module 712 and being transmitted to a receiver.

Figure 12:
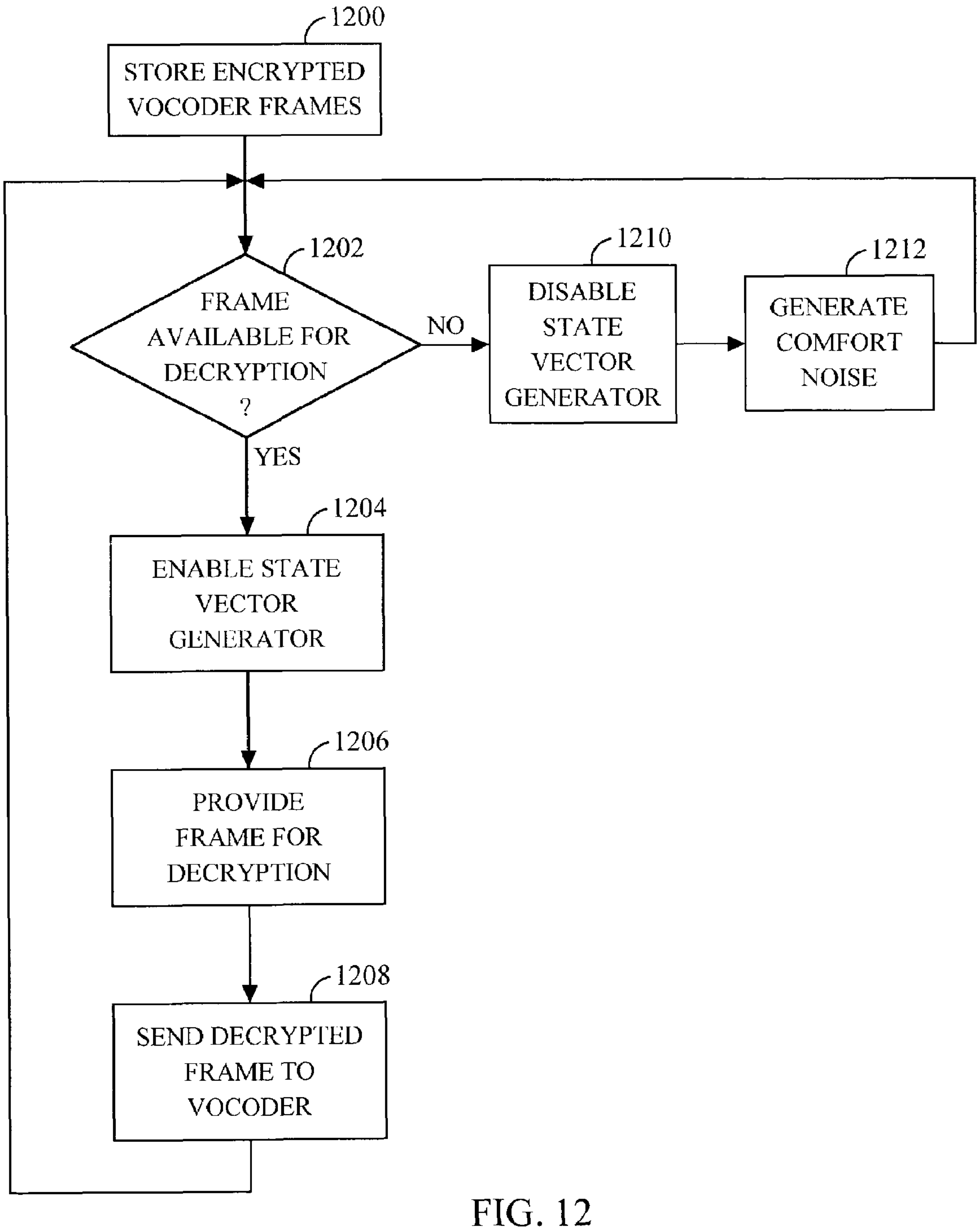
FIG. 12 is a flow diagram illustrating a method of controlling a discontinuous transmission process as used in the receiver of FIG. 9.

FIG. 12 is a flow diagram illustrating a method of controlling a discontinuous transmission process as used in receiver 700 employing secure communications. In step 1200, encrypted vocoder frames are received and stored in receive buffer 906.

In step 1202, processor 914 determines whether a frame is available for decryption by decryption module 908. If yes, processing continues to step 1204 where state vector generator 910 is enabled, thereby incrementing a state vector for use in decrypting the vocoder frame in receive buffer 906.

In step 1206, the encrypted vocoder frame stored in receive buffer 906 is provided to encryption module 908 for decryption using the state vector and one or more decryption keys.

In step 1208, the decrypted vocoder frame is sent to vocoder 912 for decoding. Processing then continues back to step 1202 to determine if another encrypted frame is available for decryption.

If no frames are available in receive buffer 906, processing continues to step 1210 where state vector generator 910 is disabled, thereby freezing the state vector in its current state. Processor 914 then instructs vocoder 912 to generate vocoder generate comfort noise in step 1212, as specified by the last few vocoder frames successfully processed. A transmission discontinuity is preceded by several transition vocoder frames. The last few frames to be processed prior to a transmission discontinuation at transmitter 700 comprise these transition frames. The transition frames contain information pertaining to the background noise estimation occurring at transmitter 700 just prior to a transmission discontinuation. Vocoder 912 uses the information contained in the transition frames to generate a continuous series of vocoder frames similar to the transition frames so that the output of vocoder 912 is not interrupted.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A discontinuous transmission controller, comprising:

a vocoder for generating active vocoder frames from a digitized audio signal at a predetermined output rate if speech is present, for generating inactive vocoder frames during periods of speech inactivity, wherein the inactive vocoder frames are not transmitted to a receiver, and for generating transition vocoder frames during transitions from speech activity to speech inactivity, said transition vocoder frames comprising comfort information; and a state vector generator for incrementing a state vector for each generated active or transition vocoder frame, wherein the state vector generator is disabled for each inactive vocoder such that the state vector is not incremented for each inactive vocoder frame.

2. The controller of claim 1, wherein the comfort information comprises background noise information.

3. The controller of 1, wherein the controller is further adapted to encrypt each generated active and transition vocoder frames by using the state vector.

4. A method for controlling discontinuous transmissions, comprising:

determining a speech activity level in a received digitized audio signal;

generating a control signal based on the determined speech activity level;

generating active vocoder frames in a transmitter if said control signal indicates active speech activity;

generating transition frames in the transmitter if said control signal indicates a transition between said active speech activity and inactive speech activity;

generating inactive vocoder frames in the transmitter if said control signal indicates inactive speech activity, wherein the inactive vocoder frames are not transmitted to a receiver;

generating a state vector;

incrementing the state vector for each generated active or transition vocoder frame; and disabling the state vector for each inactive vocoder frame such that the state vector is not incremented for each inactive vocoder frame.

5. The method of claim 4, wherein said transition vocoder frames comprise comfort information.

6. The method of claim 5, wherein said comfort information comprises background noise information.

7. The method of claim 4, wherein the speech activity level is a voice activity level.

8. The method of claim 4, further comprising encrypting the generated active and transition vocoder frames by using the state vector.

9. An apparatus for controlling discontinuous transmissions, comprising:

means for determining a speech activity level in a received digitized audio signal;

means for generating a control signal based on the determined speech activity level;

means for generating active vocoder frames in a transmitter if said control signal indicates active speech activity;

means for generating transition frames in the transmitter if said control signal indicates a transition between said active speech activity and inactive speech activity;

means for generating inactive vocoder frames in the transmitter if said control signal indicates inactive speech activity, wherein the inactive vocoder frames are not transmitted to a receiver;

means for generating a state vector;

means for incrementing the state vector for each generated active or transition vocoder frames; and means for disabling the state vector for each inactive vocoder frame such that the state vector is not incremented for each inactive vocoder frame.

10. The apparatus of claim 9, wherein said transition vocoder frames comprise comfort information.

11. The apparatus of claim 10, wherein said comfort information comprises background noise information.

12. The apparatus of claim 9, wherein the speech activity level is a voice activity level.

13. The apparatus of claim 9, further comprising:

means for encrypting the generated active and transition vocoder frames by using the state vector.

14. A computer-readable medium comprising instructions for controlling discontinuous transmissions, said instructions being executable by at least one computer to:

determine a speech activity level in a received digitized audio signal;

generate a control signal based on the determined speech activity level;

generate active vocoder frames in a transmitter if said control signal indicates active speech activity;

generate transition frames in the transmitter if said control signal indicates a transition between said active speech activity and inactive speech activity;

generate inactive vocoder frames in the transmitter if said control signal indicates inactive speech activity, wherein the inactive vocoder frames are not transmitted to a receiver;

generate a state vector;

increment the state vector for each generated active or transition vocoder frame; and disable the state vector for each inactive vocoder frame such that the state vector is not incremented for each inactive vocoder frame.

15. The computer-readable medium of claim 14, wherein said transition vocoder frames comprise comfort information.

16. The computer-readable medium of claim 15, wherein said comfort information comprises background noise information.

17. The computer-readable medium of claim 14, wherein the speech activity level is a voice activity level.

* * * * *